United States Patent [19]

Williams

[11] Patent Number: 5,245,930
[45] Date of Patent: Sep. 21, 1993

[54] EMERGENCY LIFE SAVING VEHICLE

[76] Inventor: William H. Williams, Box 12087, Pensacola, Fla. 32590

[21] Appl. No.: 824,566

[22] Filed: Jan. 23, 1992

[51] Int. Cl.$^5$ .................................... B61B 13/00
[52] U.S. Cl. ............................. 104/120; 104/27; 104/51; 104/245; 104/307
[58] Field of Search ............... 104/118, 119, 120, 245, 104/247, 51, 27, 28, 307; 105/141; 280/790; 180/131

[56] References Cited

U.S. PATENT DOCUMENTS

| | | | |
|---|---|---|---|
| 2,836,129 | 5/1958 | Jaeger | 104/120 |
| 2,853,956 | 9/1958 | Wenner-Gren | 104/120 |
| 3,548,751 | 12/1970 | Izhelya | 104/120 |

FOREIGN PATENT DOCUMENTS

| | | | |
|---|---|---|---|
| 0516473 | 1/1953 | Belgium | 104/120 |
| 0738116 | 10/1955 | United Kingdom | 104/119 |
| 0946570 | 1/1964 | United Kingdom | 104/120 |

Primary Examiner—Mark T. Le
Attorney, Agent, or Firm—Keck, Mahin & Cate

[57] ABSTRACT

An emergency life saving vehicle (ELSV) for providing emergency services on a bridge independently of traffic conditions thereon. In particular, the ELSV conforms to the particular configuration of a bridge so as to ride along an otherwise unused portion of the bridge, and thereby circumvent any traffic which may have accumulated on the bridge. There are at least three different embodiments of the ELSV, each embodiment corresponding to a particular bridge structure. A first embodiment has a raised center portion so that the ELSV is able to straddle a lane dividing wall on a single span bridge; a second embodiment is adapted to straddle a space between two adjacent and parallel spans of a two span bridge by simultaneously riding on the interior walkways of each span; and a third embodiment rides along the interior walkways and retaining walls of a two span bridge. The ELSV can be controlled remotely and, among other things, carries emergency medical equipment, rescue equipment, and firefighting equipment to the scene of an incident on the bridge. In addition, the ELSV also carries cots for transporting injured victims of an incident, such as a personal injury automobile accident or a car fire.

6 Claims, 18 Drawing Sheets

EMERGENCY LIFE SAVING VEHICLE

FIELD OF THE INVENTION

The present invention is related to the art of emergency vehicles, and in particular, is related to an emergency vehicle which is adapted to ride on an otherwise unused portion of a bridge.

BACKGROUND OF THE INVENTION

Traffic accidents have traditionally resulted in long highway back-ups, injuries to motorists, and a great deal of anxiety for other motorists who are caught in the resulting back-ups. These problems are even further compounded when a traffic accident, with injuries, occurs on a heavily used bridge. The limited space associated with a conventional bridge usually prevents a motorist from simply going around such an accident, and as a result, the bridge practically becomes a parking lot for many motorists who arrive on the bridge just after the accident occurs. In many cases, motorists are trapped on the bridge until the accident scene is cleared, and if injuries have occurred, the accident is usually not cleared until well after emergency medical service (EMS) personnel have arrived and subsequently removed any victims of the accident and/or damaged vehicles.

Unfortunately, for the EMS personnel, they too are affected by traffic back-ups, and as a result, arrive at the scene later than would otherwise be expected. Although EMS personnel have traditionally been able, to drive conventional ambulances on highway shoulders or even across grass median strips to thereby circumvent a traffic back-up on a highway, they are usually unable to do the same on a bridge. There tends to be more limited space on a bridge, and motorists who are trapped on the bridge and are unable to get around the accident, become obstacles for the EMS personnel. Often, the only way around the traffic may be a walkway or retaining wall at the edges of the traffic lanes. This space is frequently too small for and useless to a conventional ambulance, and as a result, EMS personnel are often forced to leave their ambulances or other vehicles at the end of the bridge, and hand carry equipment to the scene. Alternatively, EMS personnel can also block opposing traffic, travel across the bridge via opposing lanes, subsequently turn around, and approach the accident scene from an opposite direction. Whichever of the two aforementioned approaches is used, the delays incurred can be substantial. A delay in EMS personnel arriving on the scene will, at best, cause further delays in clearing wrecked vehicles from the scene of an accident. However, at worst, these time delays could cost the lives of injured people at the scene of the accident.

In many cases, it is also important that the victim be immobilized and treated before being transported to the hospital. Thus, there is also a need for the EMS personnel to arrive promptly with equipment such as stretchers, backboards, neck braces, drugs and other treatment devices. Since most of this equipment is kept on an ambulance, it becomes even more important that the ambulance accompany the EMS personnel all the way to the scene, and that the ambulance not be left at the end of the bridge.

SUMMARY OF THE INVENTION

It is a primary object of the present invention to overcome the aforementioned problems by providing an emergency vehicle capable of accessing any point along the length of a bridge regardless of whether the traffic lanes are blocked by other vehicles.

It is another object of the present invention to provide an emergency vehicle capable of accessing both spans of a two span bridge.

It is a still further object of the present invention to provide an emergency vehicle capable of riding along a retaining wall of a bridge span.

Another object of the present invention is to provide an emergency vehicle capable of straddling a monorail-like lane dividing wall, commonly referred to as a "Jersey wall".

An even further object of the present invention is to provide an emergency vehicle capable of straddling a space between two adjacent spans of a bridge.

It is a still further object of the present invention to provide an automatic emergency vehicle capable of responding automatically to the scene of an accident or any other hazardous traffic situation.

A still further object of the present invention is to provide an emergency vehicle capable of transporting people, medical equipment, rescue tools, firefighting equipment, lighting, and fuel to and from any point along the length of a bridge.

It is an additional object of the present invention to provide an emergency vehicle having a telescopic arm and cable system for expeditiously towing disabled vehicles off a bridge.

In accordance with the present invention, an Emergency Life Saving Vehicle (ELSV) is adapted to conform to a particular bridge structure for purposes of providing emergency transportation to and from an emergency incident on the bridge. In particular, the ELSV can be designed in at least three basic configurations, each configuration corresponding to a particular bridge structure.

For bridges having only one span, and a centrally located lane dividing wall, the ELSV is designed to straddle the lane dividing wall and ride along this portion of the bridge which is normally unused by motorists. Access is thereby gained to and assistance rendered at any location along the length of the bridge, regardless of whether the traffic lanes are blocked by other vehicles.

For bridges having a pair of closely spaced, parallel spans, the ELSV is designed to straddle the space between adjacent spans and thereby provide access to any location along the length of the bridge, and to either span. In such case, the ELSV rides on an interior walkway adjacent to an interior retaining wall of each span. Again, by using a portion of the bridge normally unused by motorists, access to an accident or other similar incident, is gained regardless of existing traffic conditions.

A third ELSV configuration, relates to bridges having a pair of remotely spaced or unparallel spans, each span having an interior retaining wall and walkway. In order to provide access to either span, the ELSV rides on the interior retaining walls of each span in a monorail-like manner. In addition, the interior retaining walls of each span are extended beyond the length of the bridge in curved fashion and joined at a centrally located point beyond the ends of each span. The extended interior retaining walls then provide the ELSV with the ability to travel from one span to the other, and hence, render emergency transportation to and from an incident on either span, and anywhere along the length of each span. Again, because the ELSV utilizes portions of the bridge not normally used by motorists, access is gained regardless of existing traffic conditions.

In addition to providing transportation to and from the scene of an incident, the ELSV is equipped to carry emergency medical equipment, firefighting equipment, rescue tools including the "jaws of life", scene lighting, audible and visual warnings, as well as communications equipment such as radios and cellular telephones.

The ELSV is also designed to assist motorists who have become stranded on the bridge because of mechanical difficulties or fuel exhaustion. In particular, the ELSV is designed with a telescopic arm and cable combination capable of towing stranded vehicles to the end of a bridge. Similarly, the ELSV also contains a pair of large capacity tanks for holding gasoline and diesel fuel, both of which can be used to supply a stranded vehicle with sufficient fuel to reach a filling station.

The aforementioned and other objects, features, and advantages of the present invention will become subsequently apparent from the following description of the preferred embodiments, as well as from the associated drawings, all of which merely illustrate the inventive concept, and are in no way intended, nor should they be construed, to limit the scope of the instant invention.

DETAILED DESCRIPTION OF THE PREFERRED EMBODIMENTS

Embodiment 1

Figure 1:
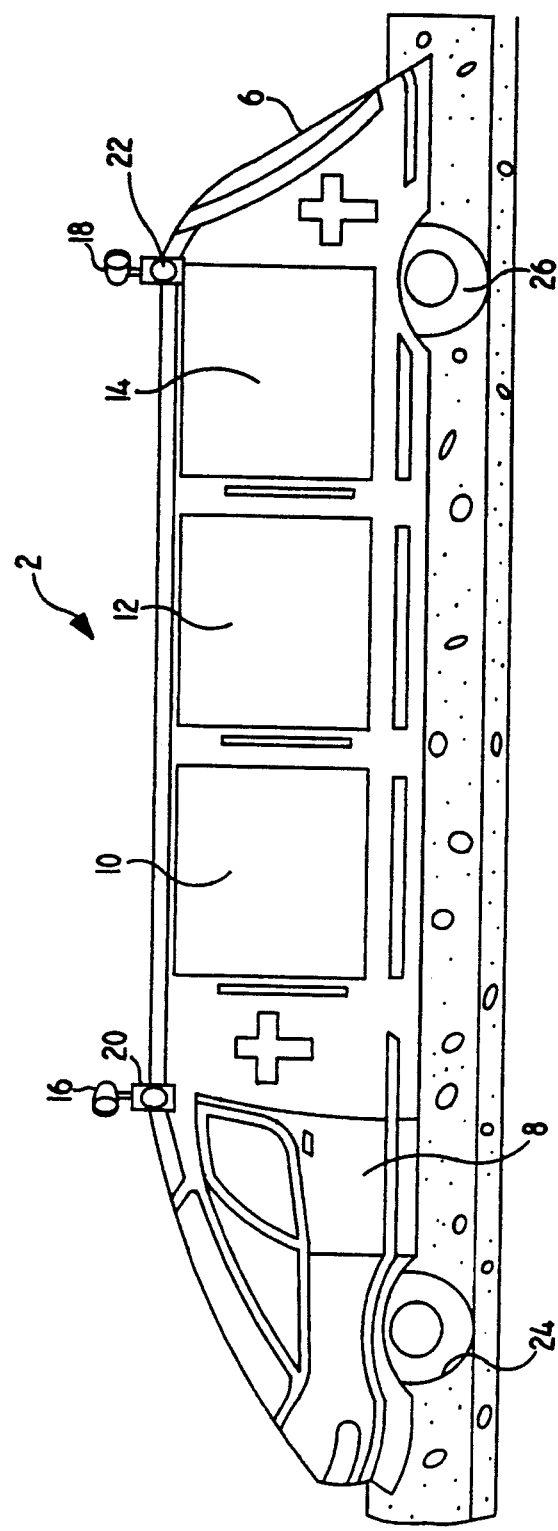
FIG. 1 is a left side view of a first embodiment of an emergency life saving vehicle in accordance with the present invention.
Figure 2:
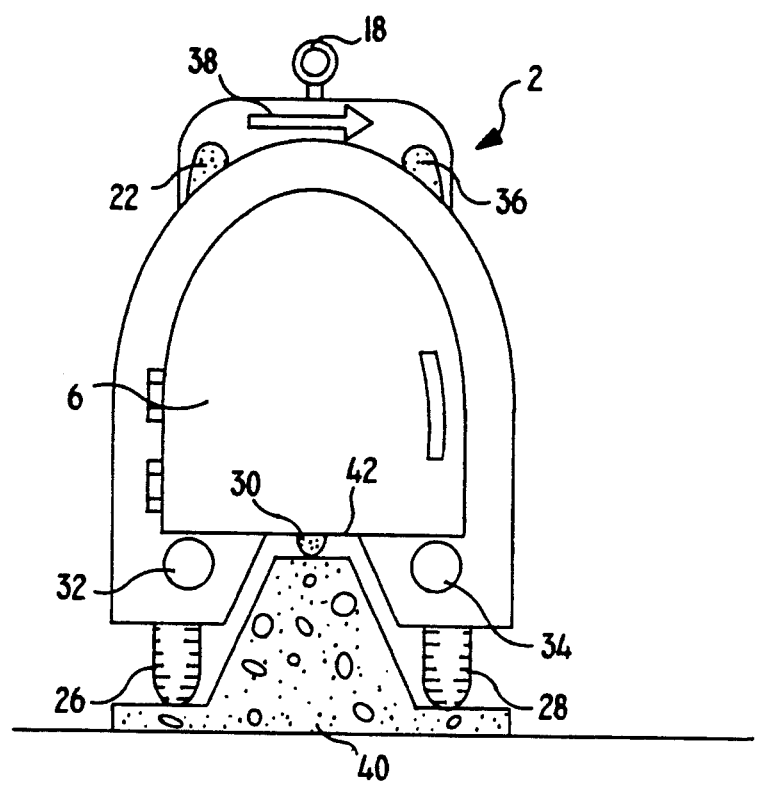
FIG. 2 is a rear view of the first embodiment of the emergency life saving vehicle.
Figure 3:
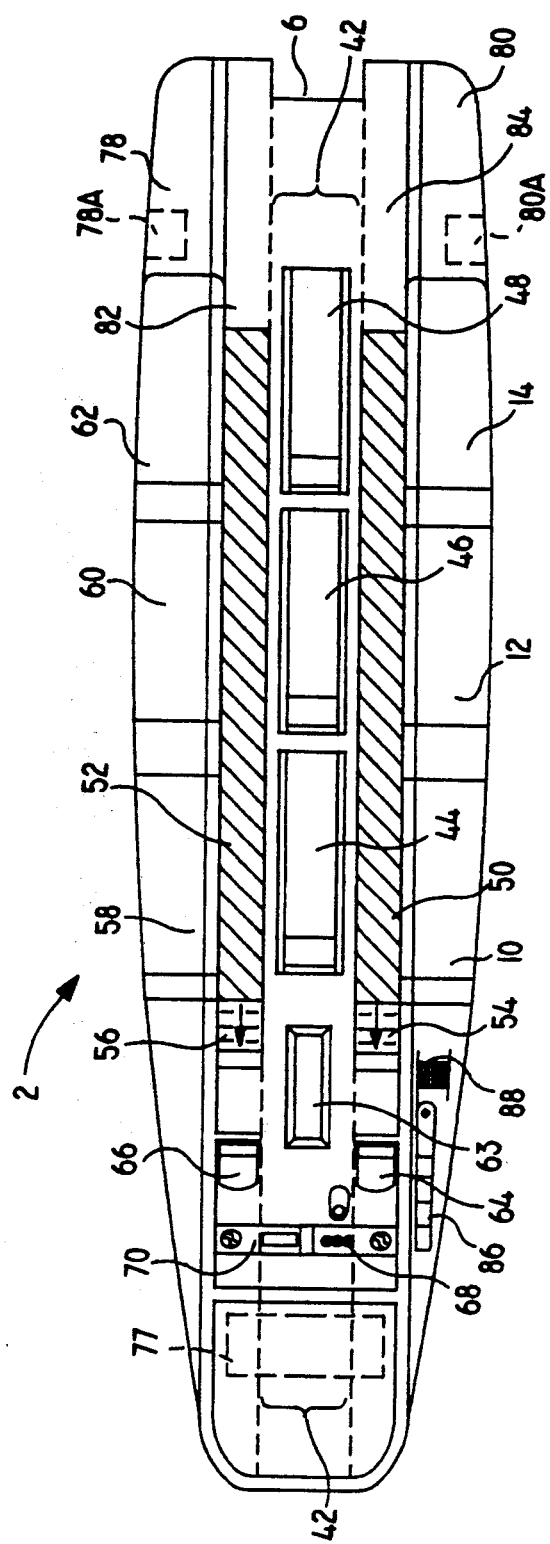
FIG. 3 is a interior top view of the first embodiment of the emergency life saving vehicle.

With reference to FIGS. 1-3, an emergency life saving vehicle (ELSV) 2 in accordance with the first embodiment of the present invention will now be described. The ELSV 2 comprises an elongated monorail-like automotive vehicle having a raised centrally located wheel 30; four ground-level wheels (one not illustrated) 24, 26, and 28; and a raised center portion 42 coextending with the length of the ELSV 2. The raised center portion 42 allows the ELSV 2 to straddle a lane dividing wall 40, while the centrally located wheel 30, which is positioned higher than the other four wheels 24, 26, and 28, rides along the top of the lane dividing wall 40.

The ELSV 2 further comprises a rear entrance 6; a driver's entrance 8; a passenger entrance (not shown) located oppositely from the driver's entrance; six internally and externally accessible compartments 10, 12, 14, 58, 60, and 62; two roof-mounted adjustable flood lights 16 and 18; four emergency response lights 20, 22, and 36, the fourth of which is not illustrated; two tail lights 32 and 34; a rearward facing flashing traffic control arrow 38; and a forward facing flashing traffic control arrow (not illustrated). The fourth emergency response light, which is not illustrated, is located toward the front of the ELSV 2 laterally across from the emergency response light 20.

In addition, three horizontally placed cots 44, 46, and 48 are centrally located inside the ELSV 2 above the raised center portion 42. Located laterally with respect to the cots 44, 46, and 48, are two low lying wells 50 and 52. The low lying wells 50 and 52 are formed on opposite sides of the raised portion 42, and can be entered into by way of stairs 54 and 56, respectively.

Located at both lateral sides of the ELSV 2, are the six internally and externally accessible compartments 10, 12, 14, 58, 60, and 62, all of which can be accessed from either inside or outside the ELSV 2. The compartments 10, 12, 14, 58, 60, and 62 provide the ELSV 2 with storage space for emergency equipment such as medical equipment, rescue tools, firefighting equipment, and additional scene lighting. Inside the ELSV 2, the location of the center most wheel 30 is indicated by a wheel well 63 which protrudes up through the center of the ELSV 2. Furthermore, toward the front of the ELSV 2, there is a driver's seat 64 and a jump seat 66, and in front of both seats 64 and 66, there are an instrument and control panel 68 for operating the ELSV 2, and a communications panel 70 for contacting a dispatcher, hospital, or other EMS unit by radio or cellular telephone. As an added feature of the present invention, a loud speaker system can be incorporated into the communications panel 70 for alerting and audibly providing information to persons outside the ELSV 2.

The ELSV 2 is selectively propelled by gasoline, diesel, or electrical power, or any combination thereof. The ELSV 2 is correspondingly provided with a suitable drive means 77 for each fuel source, and carries diesel fuel, gasoline, and batteries regardless of which fuel source is used. The gasoline and diesel fuel are both stored separately in a pair of high capacity tanks 78 and 80, respectively, while the batteries are kept in a pair of battery compartments 82 and 84 beneath the floor and toward the rear of the ELSV 2. In addition, the gasoline tank 78 and diesel fuel tank 80 are both equipped with suitable nozzle and pumping mechanisms 78A and 80A, respectively, for externally delivering the contents of each tank.

As an even further feature, the ELSV 2 is also equipped with a relocatable telescopic arm 86 and cable system 88, both of which can be deployed from either side of the ELSV 2, and the combination of which, is capable of towing vehicles off the bridge.

As illustrated in FIG. 2, the ELSV 2 of the first embodiment is suitable for use on a bridge 90 having a lane dividing wall 40 centrally disposed coextensively along the entire length of the bridge 90. The lane dividing wall 40 provides a means for separating a first lane 92 of traffic from a second lane 94 of traffic. In addition, two retaining walls 96 and 98 are provided along the lateral edges of the bridge 90, but are not essential to the operation of the ELSV 2.

Figure 4:
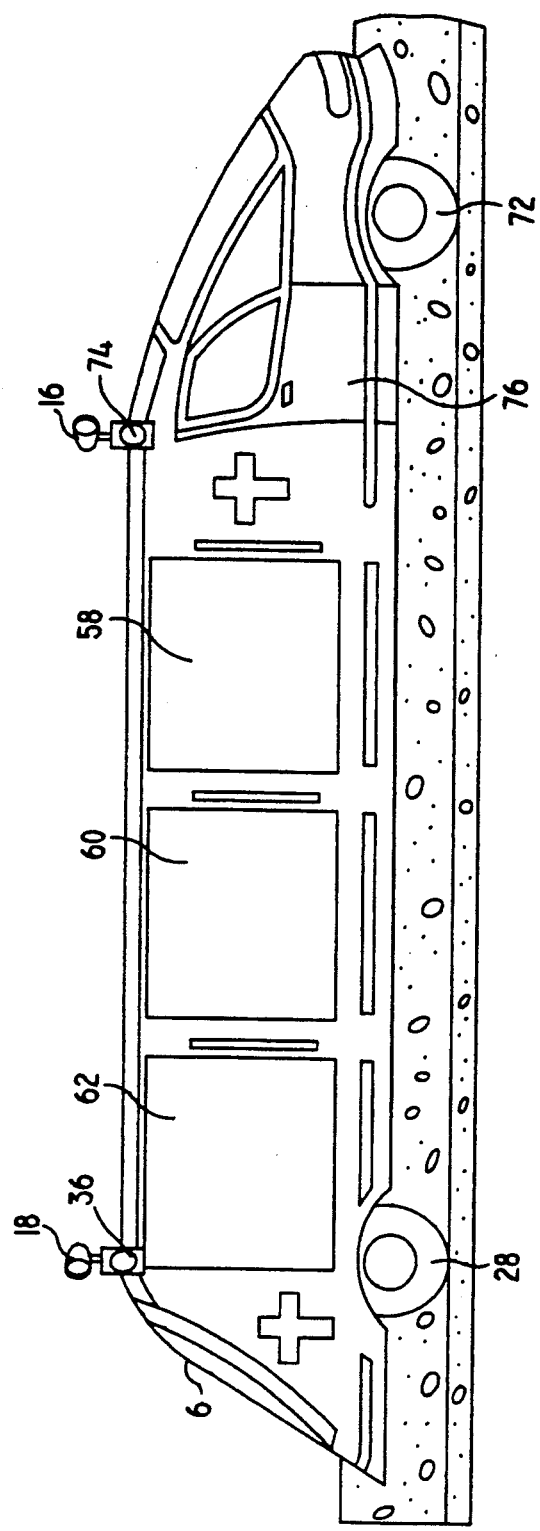
FIG. 4 is an aerial view of a garage-like building for use in conjunction with the first embodiment of the emergency life saving vehicle.
Figure 5:
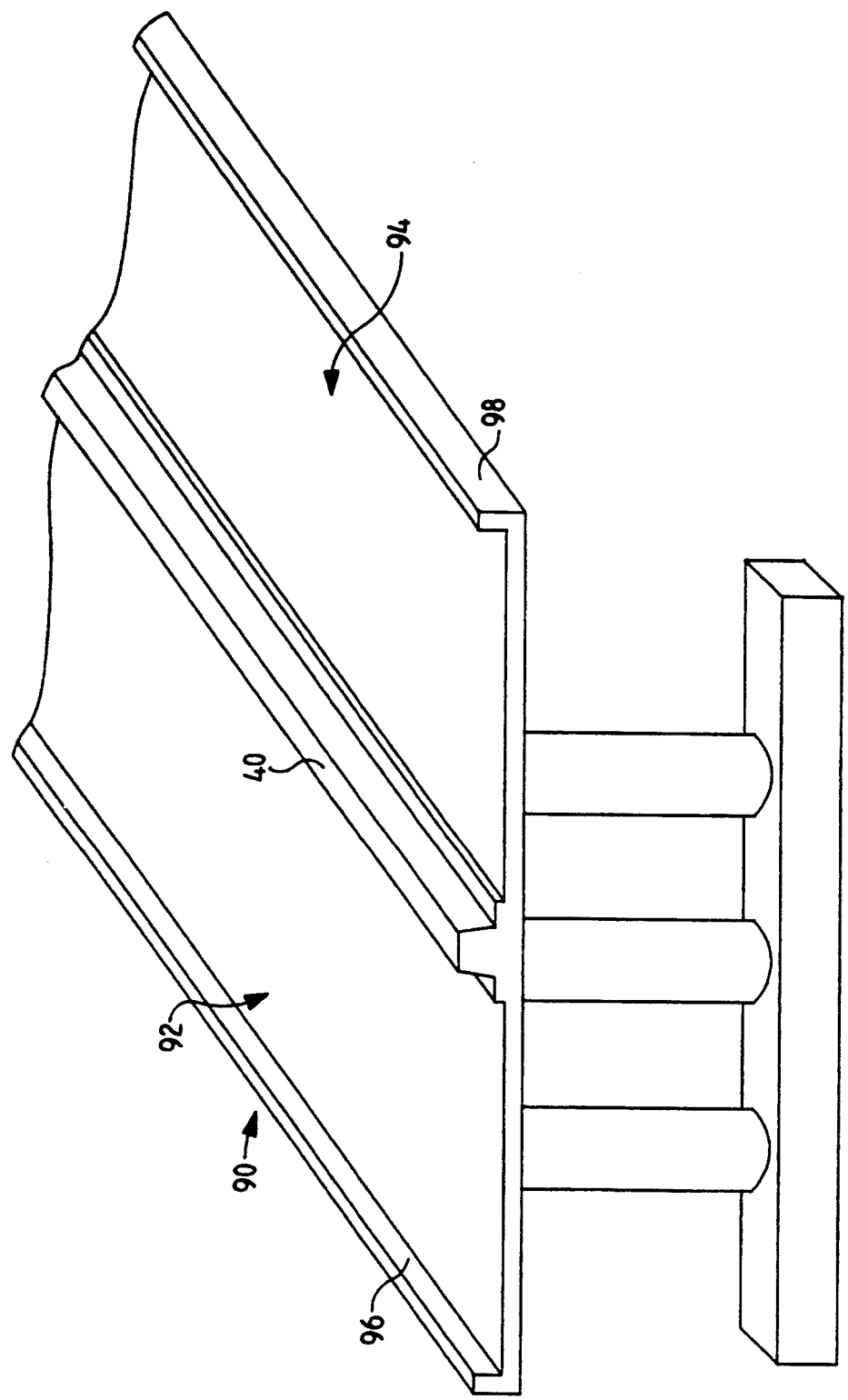
FIG. 5 is a top view of a second embodiment of the emergency life saving vehicle in accordance with the present invention.
Figure 6:
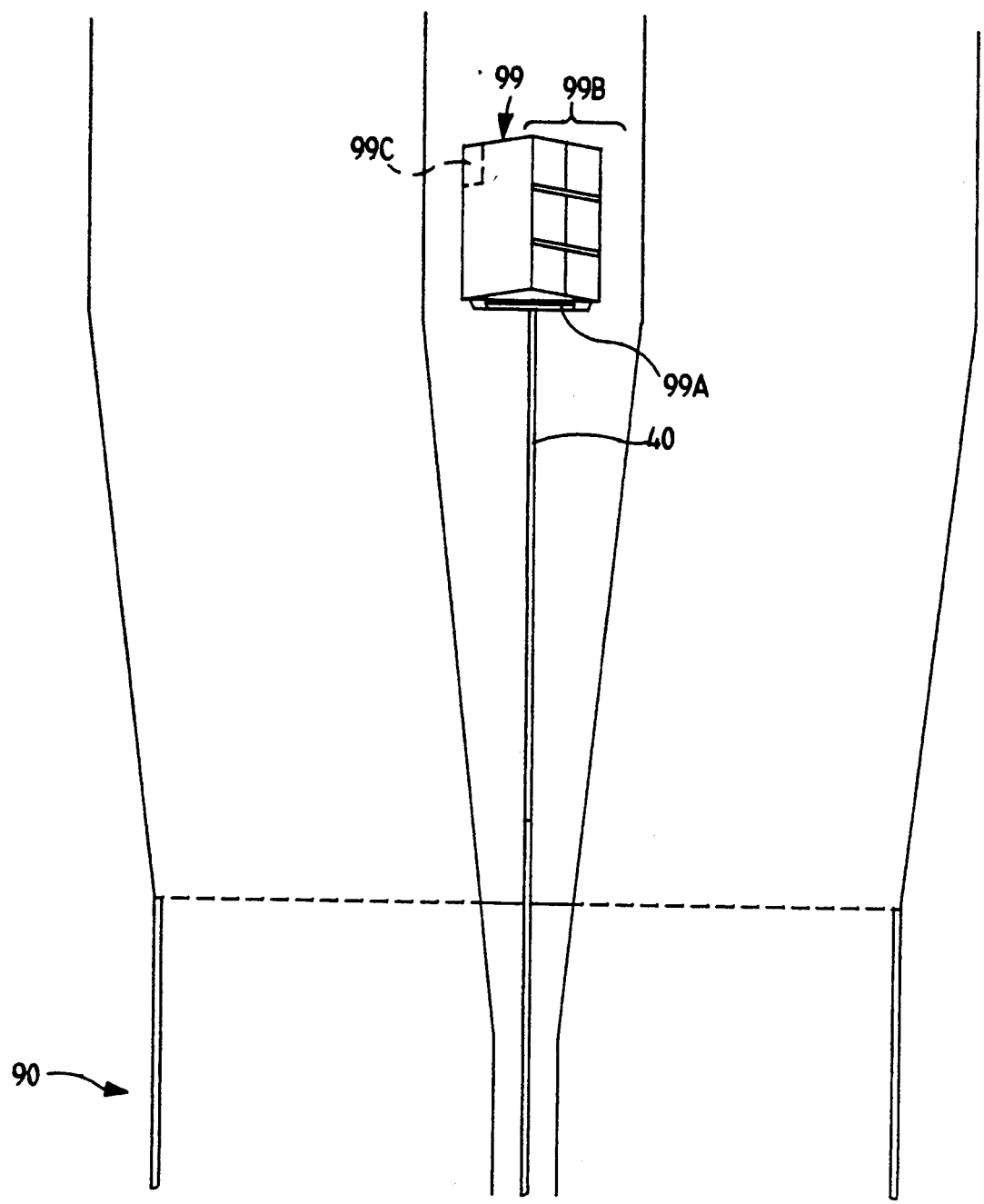
FIG. 6 is a left side view of the second embodiment of the emergency life saving vehicle.
Figure 7:
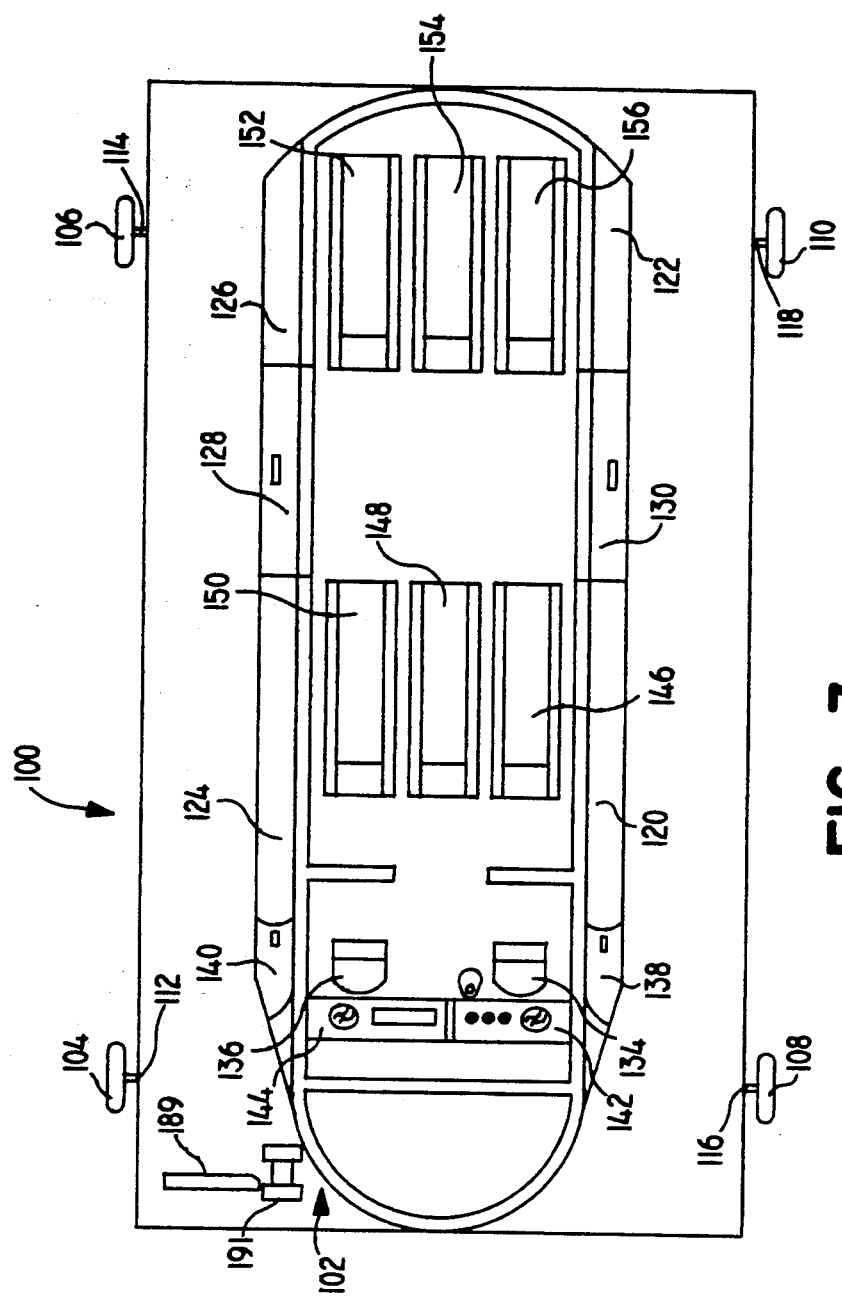
FIG. 7 is a right side view of the second embodiment of the emergency life saving vehicle.
Figure 8:
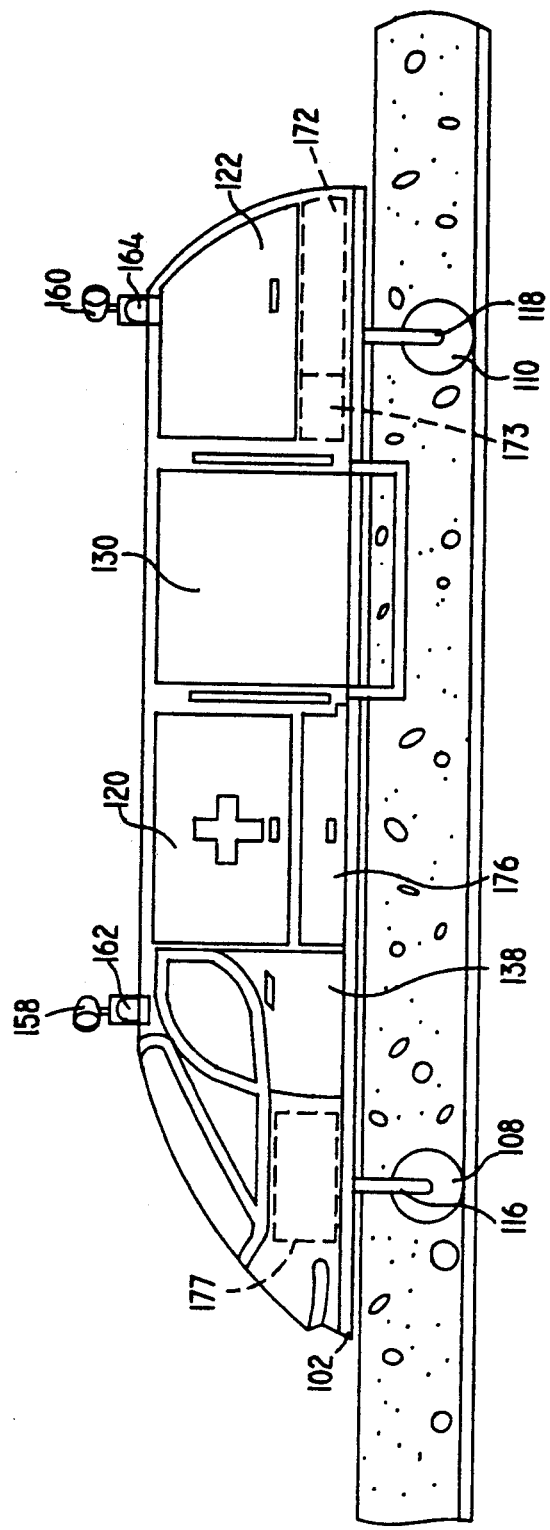
FIG. 8 is a frontal view of the second embodiment of the emergency life saving vehicle.

With reference to FIG. 4, at one end of the bridge 90, a garage-like building 99 is provided into which the lane divider 40 is extended for the purpose of storing the ELSV 2. The garage-like building 99 is constructed with a suitable garage door 99A, thereby allowing the ELSV 2 to enter or exit the building 99. The garage-like building 99 is also provided with a set of roof-mounted solar panels 99B for converting solar energy into electrical energy. The resulting electrical energy is then supplied by a suitable and disconnectable means, to the batteries of the ELSV 2 so as to maintain a predetermined electrical voltage therein. Resulting electrical energy is also supplied to electrical equipment in the building 99 itself, such as communications equipment and access granting circuitry. In addition, a back-up diesel generator 99C is also provided for maintaining electrical power should the solar panels 99B fail to produce a sufficient supply of electrical energy. By using such an overall arrangement, the garage-like building 99 and the ELSV 2 of the present invention, are made to be self-sustaining and are therefore unaffected by external power outages.

With regard to ELSV 2 operations, in the event that a motorist becomes stranded on the bridge 90 due to fuel exhaustion, a properly trained police officer or other qualified person can obtain access to the ELSV 2, and by using the appropriate nozzle and pumping mechanism 78A or 80A, can provide the stranded vehicle with the appropriate fuel and quantity of fuel needed to reach the nearest filling station. During such fuel pumping operations, the emergency response lights 20, 22, and 36 (one response light not illustrated) and the lighted traffic control arrows 38 (one arrow not illustrated) visually warn other motorists of an existing hazardous situation and provide the other motorists with an indication of appropriate measures to be taken, respectively.

Likewise, if a motorist becomes stranded because of a mechanical problem, personnel using the ELSV 2 can deploy the telescopic arm 86 and the associated cable system 88 to expeditiously tow the stranded vehicle off the bridge 90 and out of harms way. Inasmuch as there is no need to wait for a tow truck when using the ELSV 2, a resulting traffic back-up is significantly reduced, if not altogether avoided.

Similarly, if an emergency incident, such as a traffic accident or car fire, occurs on the bridge 90, a 911 dispatcher is usually alerted to the situation by a calling party. In accordance with the calling party's report, the 911 dispatcher then dispatches an appropriate response team to the scene, and activates a communications system which remotely unlocks and activates the ELSV 2. The communications system and the ELSV 2 can also be programmed so that, as a result of such activation, the garage door 99A of the garage-like building 99 opens, and the ELSV 2 automatically or by remote control from a 911 communications center, exits the garage-like building 99. In which case, the ELSV 2 then approaches the bridge 90 and activates its emergency response lights 20, 22, and 36 while awaiting the arrival of a response team. By activating its emergency response lights 20, 22, and 36 before the arrival of a response team, the ELSV 2 is able to warn subsequently arriving motorists of a possible hazardous condition.

As an alternative to such programming and use of a communications system, EMS, police, and firefighting personnel can be provided with a combination or access code which unlocks and activates the ELSV 2. This way, the dispatcher need not activate a communications system, nor is there a need for remote control or programming of the ELSV 2.

If the nature of the emergency incident or the resulting traffic back-up prevents the driving of conventional emergency apparatus to the actual scene of the incident, the first response team to arrive at the bridge 90, be it firefighters, police officers, or EMS personnel, boards the ELSV 2, and proceeds to the scene of the incident in the ELSV 2. Because the ELSV 2 straddles the lane divider 40 of the bridge 90 and thereby circumvents traffic on the bridge 90, access to the incident scene is gained, and an otherwise resulting delay is avoided.

If the incident, for example, is a personal injury accident, victims can be treated and immobilized, placed onto one of the cots 44, 46, or 48 of the ELSV 2, loaded in through the rear entrance 6 of the ELSV 2, and transported to an awaiting conventional ambulance at one end of the bridge 90. Preferably the awaiting ambulance will be parked at the end of the bridge 90 which is nearest to a hospital or trauma center. Once all the victims formerly aboard the ELSV 2 have been transferred to waiting ambulances, the ELSV 2 can return to the scene for more victims, or to perform other similar duties.

Also, because many incidents result in minor injuries, the interior lateral walls of the ELSV 2 are equipped with fold-out benches which can accommodate a plurality of victims having minor injuries. By seating victims on such bench seats, many more victims can be simultaneously accommodated and subsequently transported by the ELSV 2. The fold-out seats can also be used by EMS personnel as a place to sit while caring for victims of the incident.

Embodiment 2

Another embodiment of the present invention is illustrated in FIGS. 5-8 and relates to an ELSV 100 which is adapted to straddle the area between a pair of closely spaced parallel spans 178 and 180 of a two-span bridge 182. In particular, the ELSV 100 comprises an elongated automotive vehicle having four vertically oriented wheels 104, 106, 108, and 110; four axles 112, 114, 116, and 118; and a rectangular platform 102 having sufficient width to straddle the distance between individual spans 178 and 180 of the bridge 182.

The ELSV 100 further comprises two externally roof-mounted adjustable flood lights 158 and 160; two headlights 184 and 186; a roof-mounted flashing traffic control arrow 188 for directing motorists away from the scene of an emergency incident; four roof-mounted emergency response lights 162, 164, 166, and 168; four internally and externally accessible compartments 120, 122, 124, and 126; a gasoline tank 170 below compartment 126; a gasoline nozzle and pumping mechanism 171; a diesel fuel tank 172 below compartment 122; a diesel fuel nozzle and pumping mechanism 173; a battery array occupying two compartments 174 and 176 beneath compartment 124 and compartment 120, respectively, and having interconnections therebetween; and for propelling the ELSV 100, a suitable drive means 177 for each of the three sources of energy, namely, a selectively gasoline-powered, electrically-powered, and diesel-powered drive means 177. A second roof-mounted flashing traffic control arrow (not illustrated) is located facing and toward the rear of the ELSV 100.

In addition, the ELSV 100 also includes two side entrances 128 and 130; a driver seat 134; a jump seat 136; a driver entrance 138; a passenger entrance 140; an instrument and control panel 142; a communications panel 144; and six cots 146, 148, 150, 152, 154, and 156. The communications panel of the ELSV 100 is equipped with a cellular telephone, and a radio system for contacting hospitals, trauma centers, or other emergency units. The communications panel is also equipped with a public address system for providing audible messages to persons outside the ELSV 100.

As in the case of the ELSV 2 of the first embodiment, the internally and externally accessible compartments 120, 122, 124, and 126 of the ELSV 100 are filled with emergency equipment such as medical equipment, firefighting equipment, rescue tools, and additional scene lighting. The equipment stored in these compartments 120, 122, 124, and 126, is accessible from either inside or outside the ELSV 100. Furthermore, a telescopic arm 189 and cable system 191, similar to that of the first embodiment, is also provided for towing stranded vehicles off the two-span bridge 182. Again, the telescopic arm 189 and cable system 191 can be selectively deployed from either side of the ELSV 100.

In operation, the ELSV 100 circumvents traffic on spans 178 and 180 of the bridge 182 by riding with wheels 104 and 106 on an interior walkway 200 adjacent to an interior retaining wall 202 of span 178, while the other wheels 108 and 110 ride on an interior walkway 204 adjacent to an interior retaining wall 206 of the other span 180. In this manner, the ELSV 100 straddles the area between the two individual spans 178 and 180.

Figure 9:
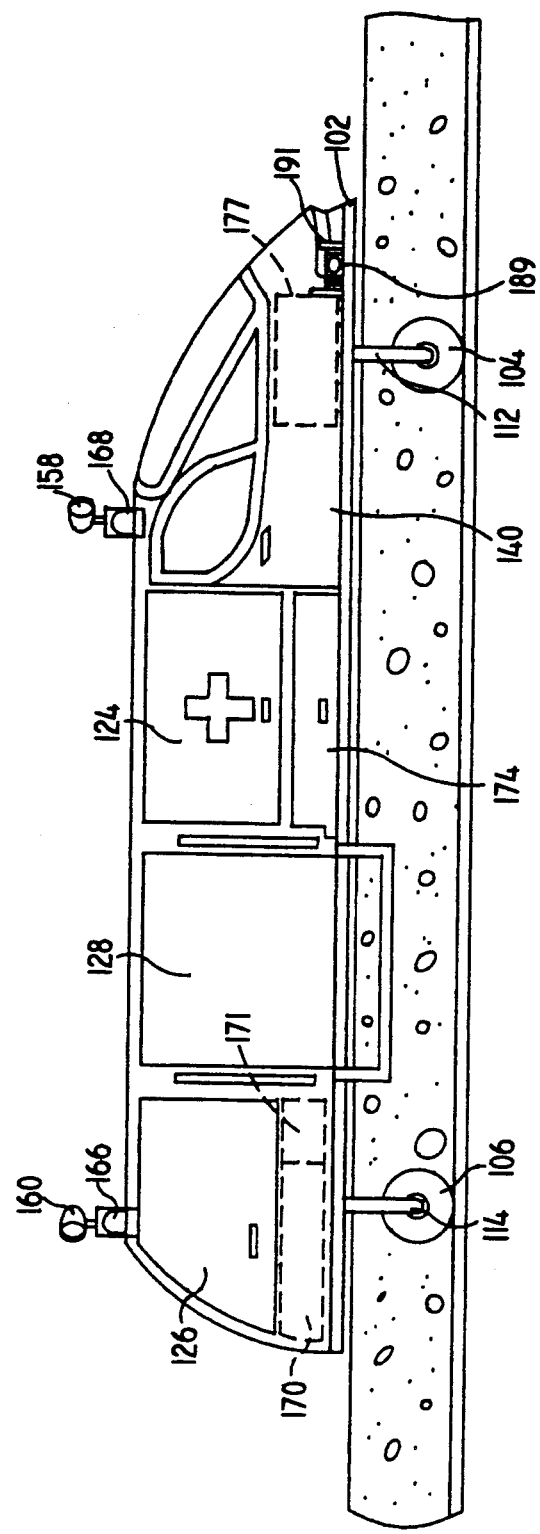
FIG. 9 is an aerial view of a garage-like building for use in conjunction with the second embodiment of the emergency life saving vehicle.

FIG. 9 shows the storage facility for the ELSV 100. By extending the retaining walls 202 and 206 and walkways 200 and 204 beyond an end of the bridge 182 and into a garage-like building 199, the ELSV 100 can be stored and operated in virtually the same manner as the ELSV 2 of the previous embodiment.

In this case, however, victims of an incident must be loaded or escorted into the ELSV 100 through a side entrance 128 or 130 of the ELSV 100, especially since there is no rear entrance on the ELSV 100. Furthermore, loading victims through the longitudinal center of the ELSV 100, as in the case of side entrances 128 and 130, advantageously maximizes the distance between the victim and the platform 102 edges, and thereby, reduces the likelihood of dropping the victim overboard, below the bridge 182.

Embodiment 3

Figure 10:
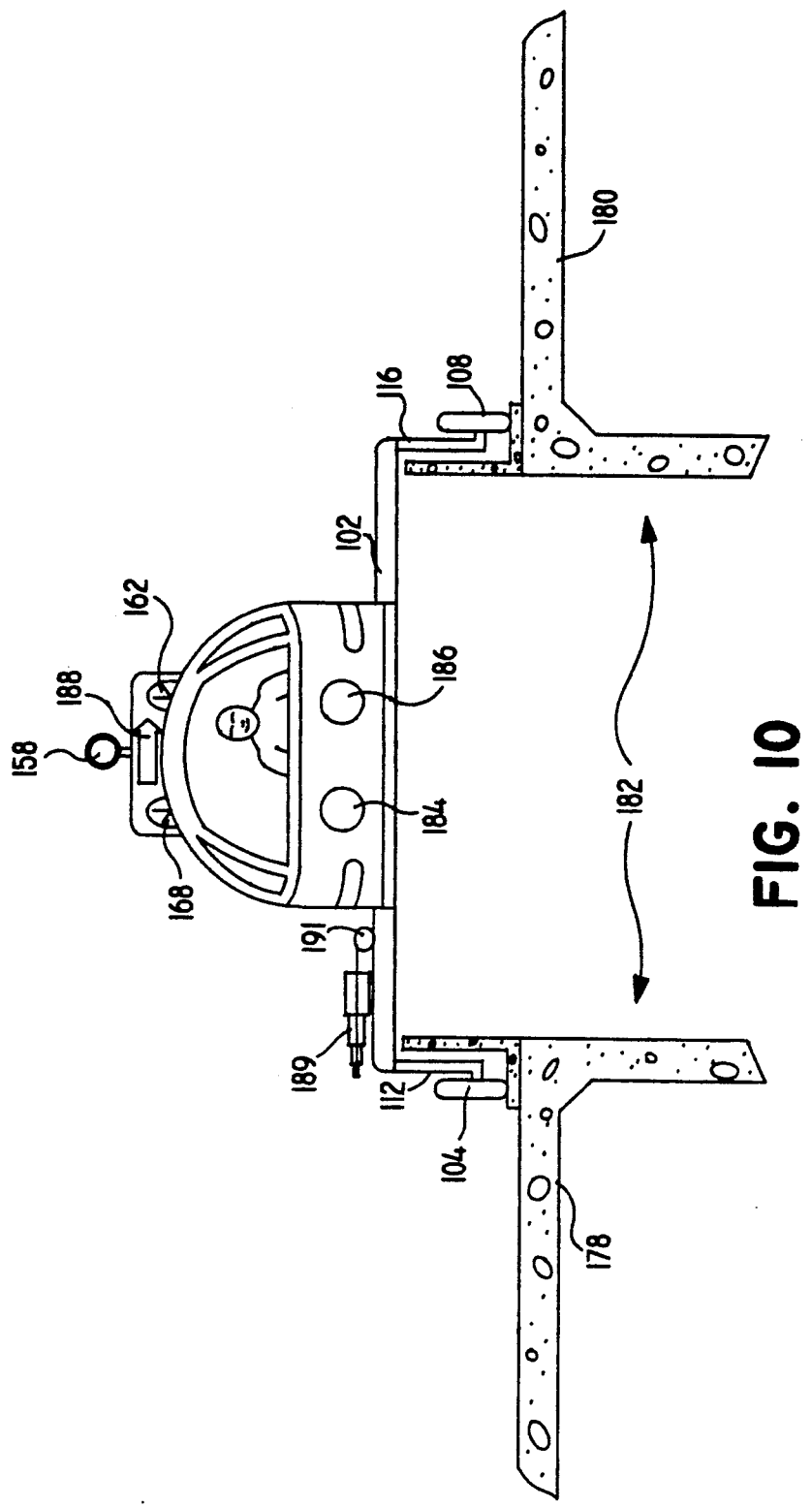
FIG. 10 is a left side view of a third embodiment of the emergency life saving vehicle in accordance with the present invention.
Figure 11:
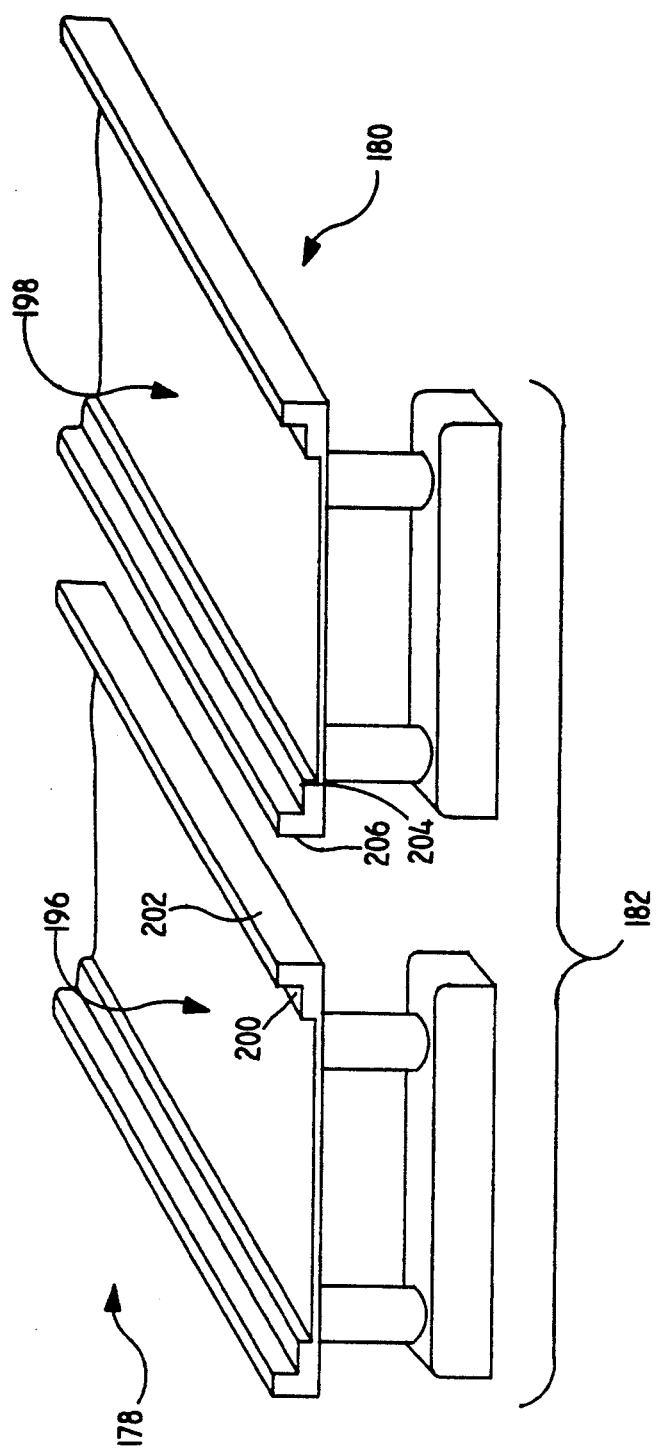
FIG. 11 is a rear view of the third embodiment of the emergency life saving vehicle.

FIGS. 10 and 11 illustrate a third embodiment of the present invention. Specifically, the ELSV 200 is provided for a two-span bridge, the two spans of which are either unparallel to one another, or separated by a relatively large distance. The ELSV 200 comprises an elongated monorail-like automotive vehicle having a raised center portion 246 coextending with the longitudinal length of the ELSV 200; two horizontally arranged wheels 202 and 204; two vertically arranged wheels 232 (one vertical wheel not illustrated); and a third vertically arranged wheel 248 centrally located higher than the other wheels, in the raised center portion 246 of the ELSV 200. Although the side with the two vertically arranged wheels is not illustrated, this particular side of the ELSV 200 can easily be visualized by taking a mirror image of FIG. 1. That is, the right side of the ELSV 200 is identical to the corresponding side of the ELSV 2 of the first embodiment. In fact, the ELSV 2 of the first embodiment and the ELSV 200 of the third embodiment are identical, except for their wheel arrangements. Therefore, an illustration of the interior of the ELSV 200 is unnecessary, since it would only be a duplicate of FIG. 3.

Figure 12:
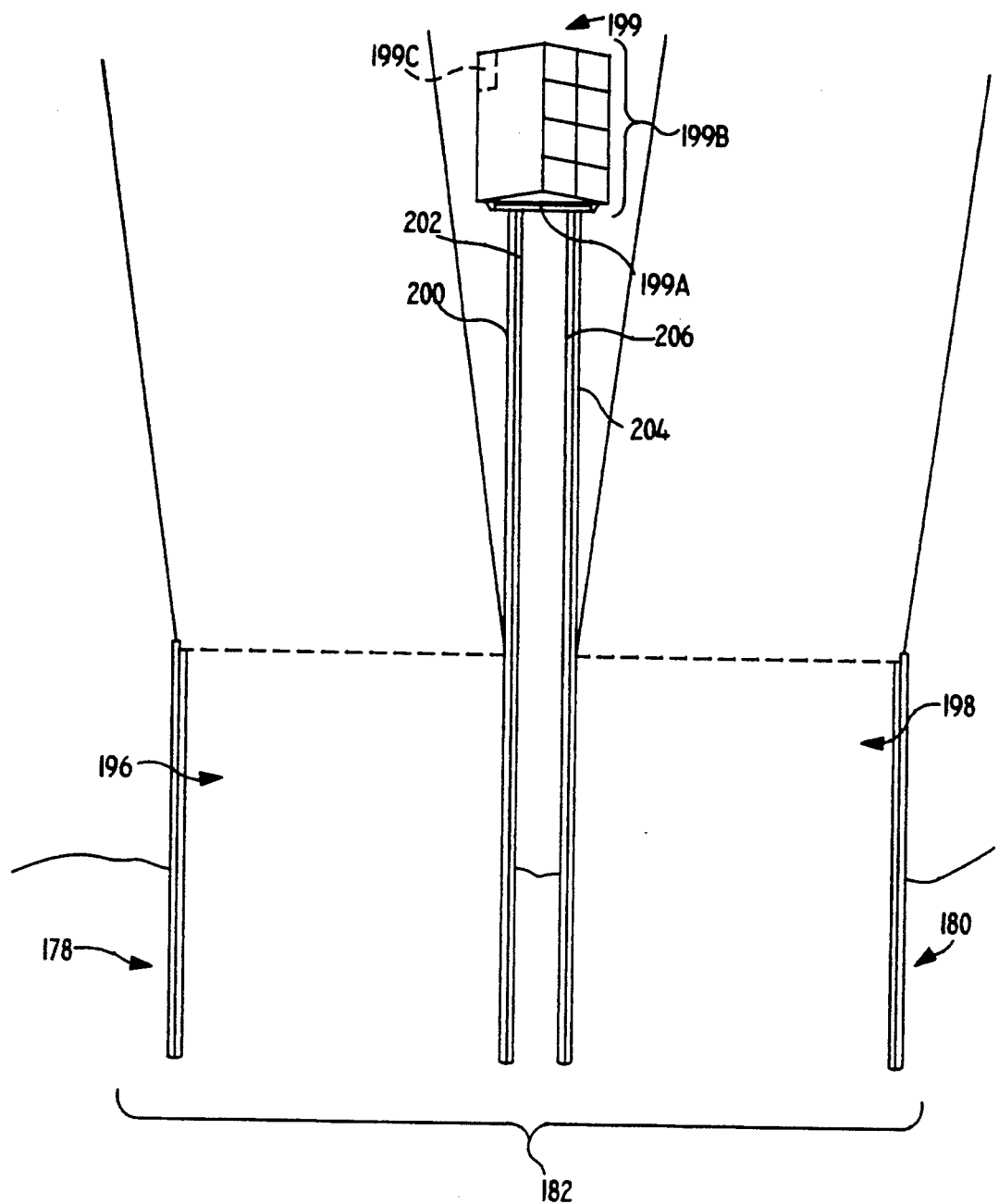
FIG. 12 is a cross-section perspective of an appropriate bridge for use in conjunction with the third embodiment of the emergency life saving vehicle.

Referring to FIG. 12, the ELSV 200 of the third embodiment is particularly well suited to ride against and on the interior retaining walls 300 and 302 and walkways 304 and 306 of each individual span 308 or 310, respectively, of a two-span bridge 312. In contrast to the second embodiment, this particular embodiment does not necessitate a perfectly parallel arrangement between the individual spans 308 and 310 of the bridge 312, nor is there a limit to the distance between individual spans 308 and 310 of the bridge 312.

Figure 13:
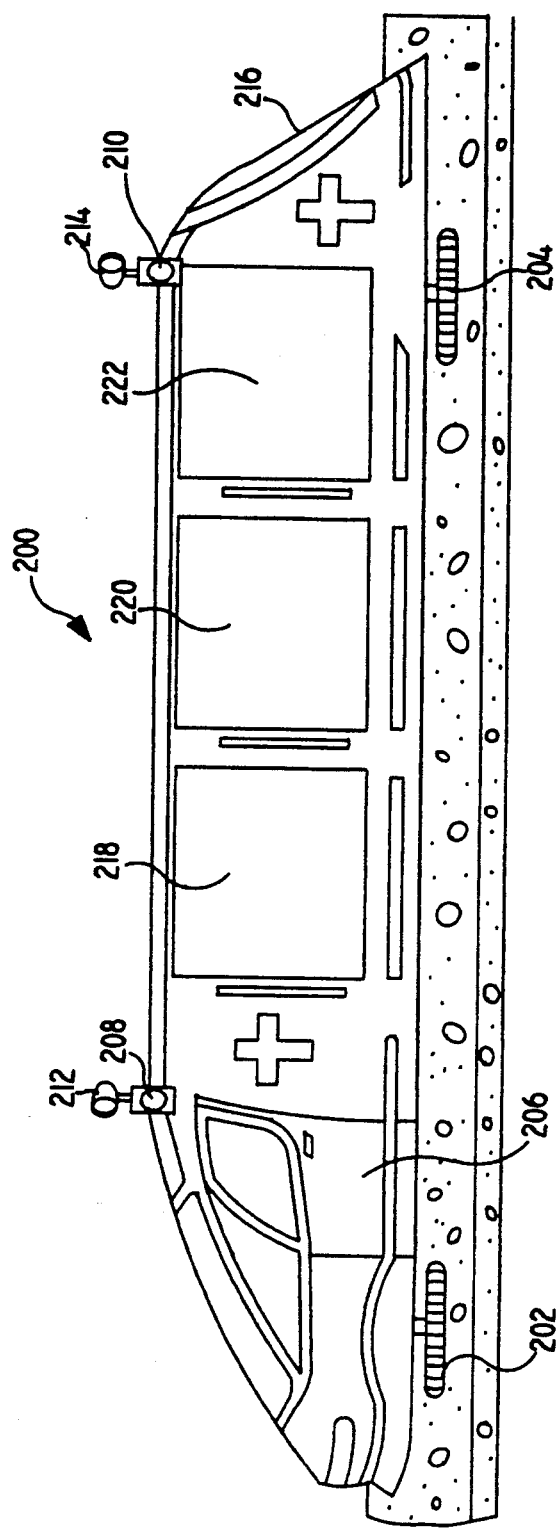
FIG. 13 illustrates a garage-like building for use in conjunction with the third embodiment of the emergency life saving vehicle.
Figure 14:
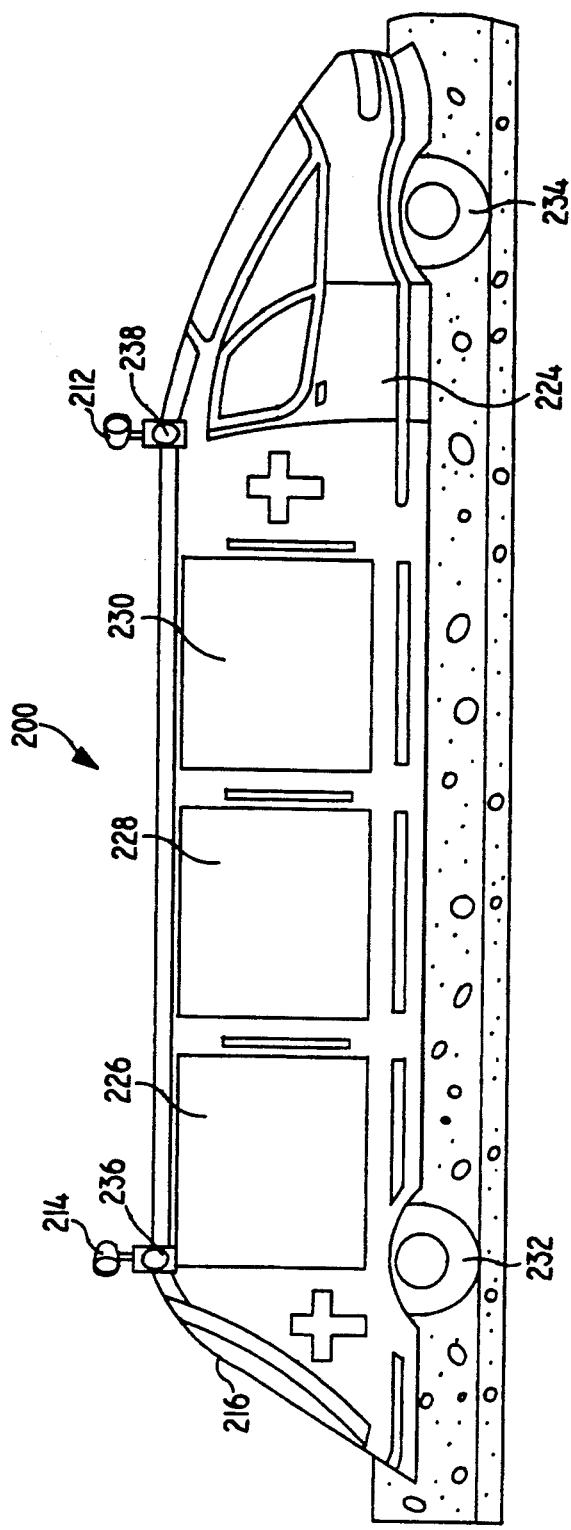
Figure 15:
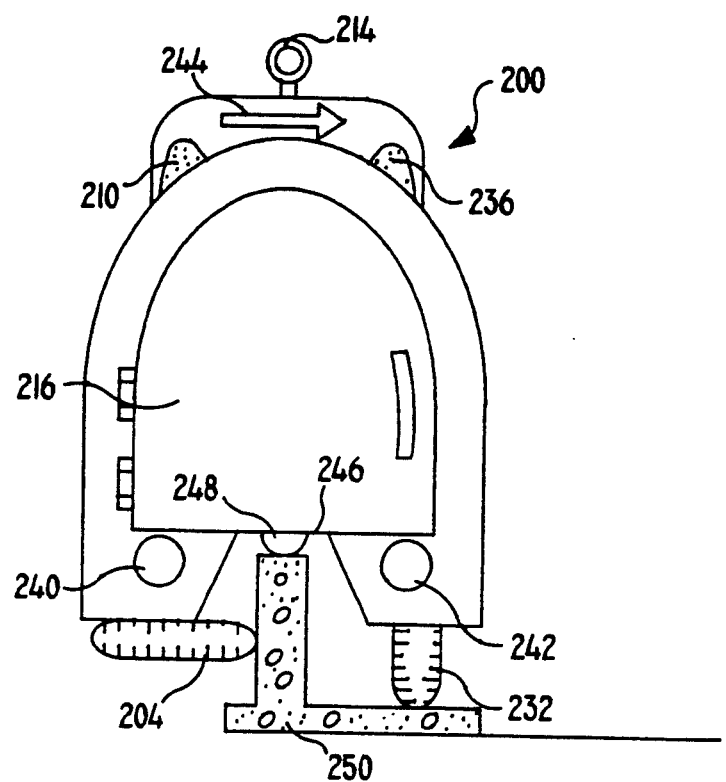
Figure 16:
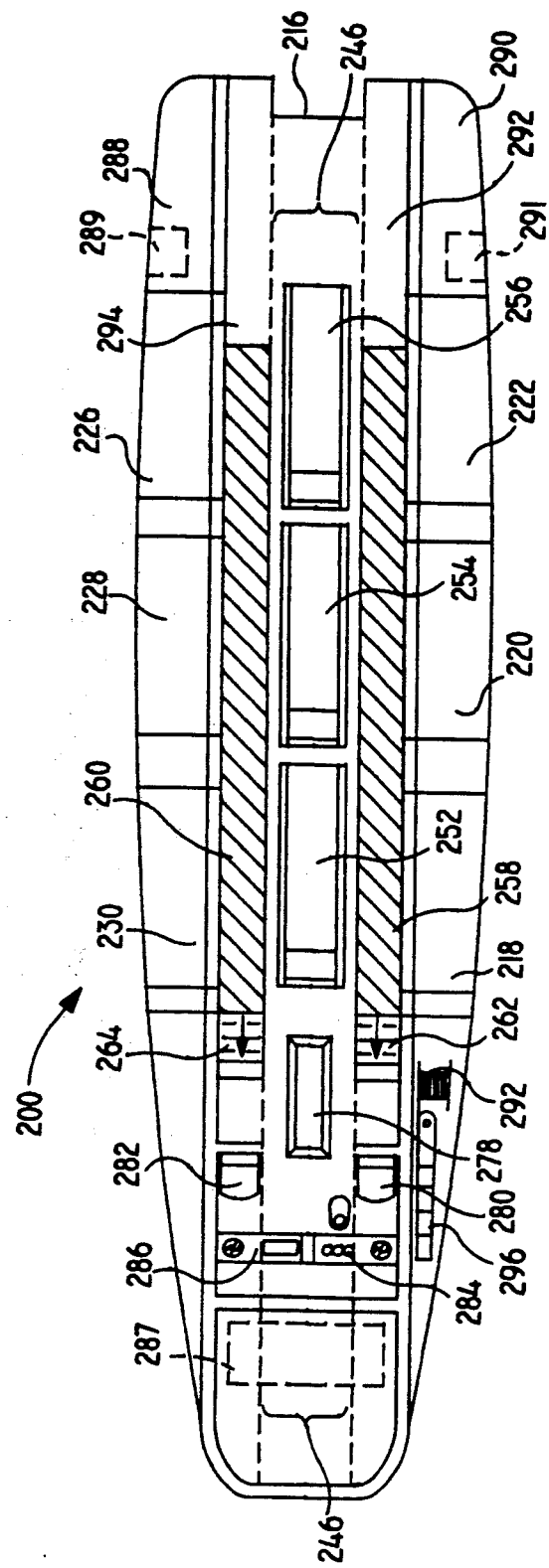
Figure 17:
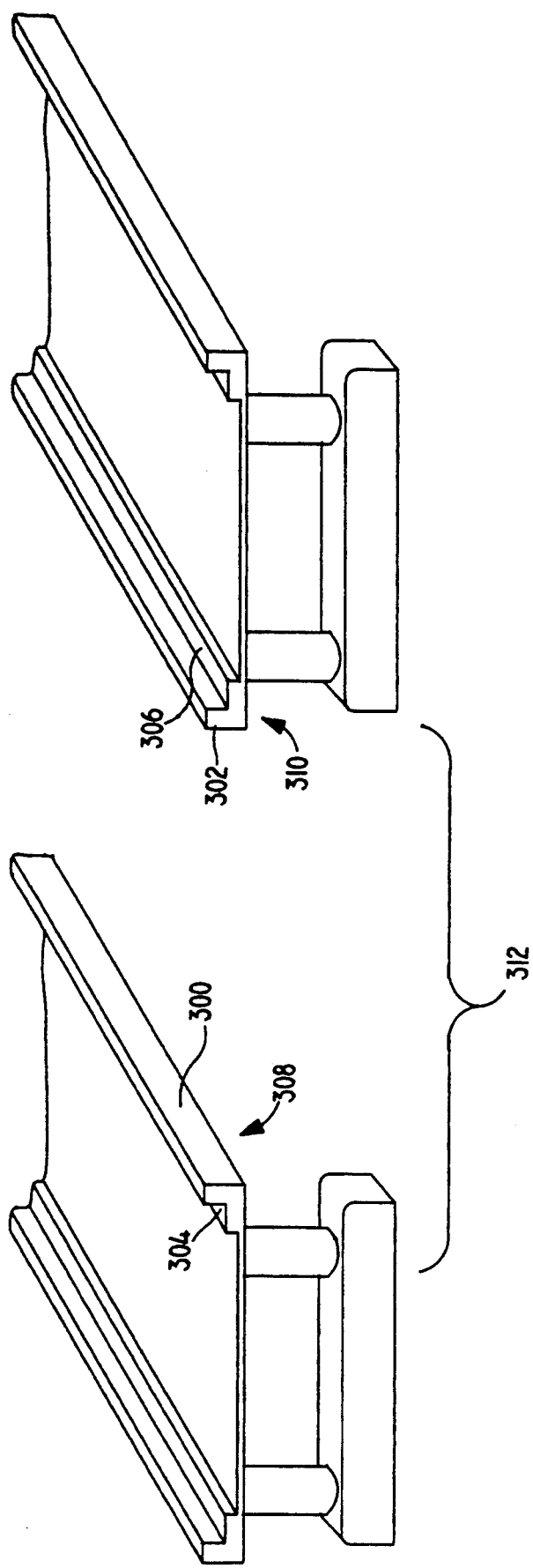
Figure 18:
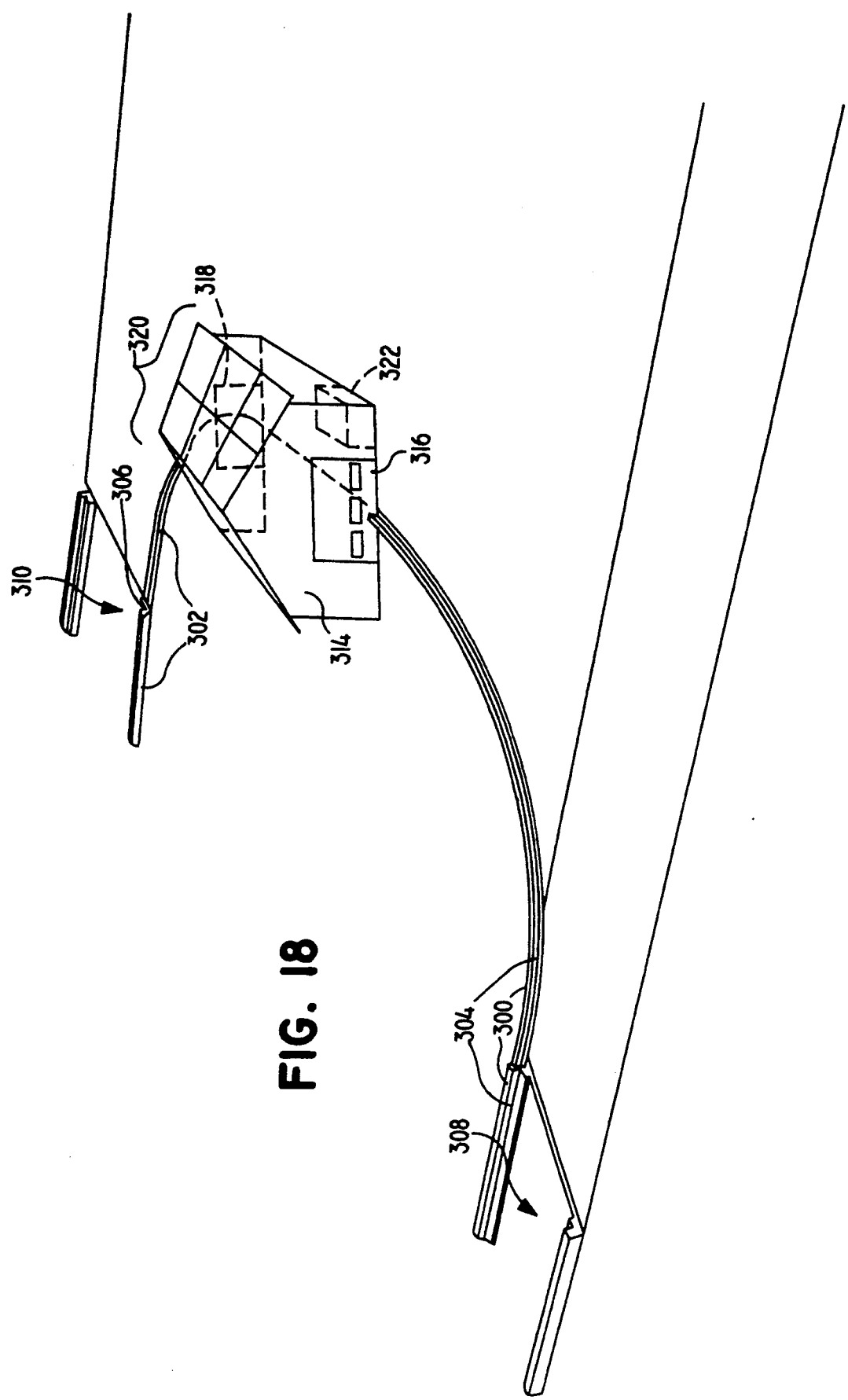

As illustrated in FIG. 13, the interior retaining walls 300 and 302 and the walkways 304 and 306 are extended beyond one end of the bridge 312 (preferably the end which is closest to a hospital) and are subsequently curved in toward one another to join at a centrally located point. A garage-like building 314 similar to that of the previous two embodiments is then placed at the point where the two interior retaining walls 300 and 302 and walkways 304 and 306 intersect. The garage-like building 314 houses the ELSV 200 when it is not in use, while two suitable garage doors 316 and 318 located at opposite ends of the garage-like building 314 provide an entrance or an exit, as the case may be, for the ELSV 200.

The ELSV 200 contains the same equipment and operates in virtually the same manner as does the ELSV 2 of the first embodiment. In this case, however, the ELSV 200 exits from the appropriate garage door 316 or 318 and rides along the interior retaining wall 300 or 302 and on walkway 304 or 306, rather than along a lane dividing wall, as in the case of the first embodiment.

In addition to the herein disclosed embodiments of the ELSV, it is also well understood that numerous modifications of the present invention will become subsequently apparent to those skilled in the art. One such modification relates to individual wheel arrangements, and in particular, the angular orientation of each wheel on the ELSV. Although there were specific arrangements and orientations illustrated in the aforementioned embodiments, it is quite evident that other arrangements will provide similar results. As an example, for the case of a lane dividing wall having a progressively thicker cross-section at the base than at the top, as illustrated in FIG. 2, the wheels of the ELSV can be angled inwardly so as to assume an angular orientation somewhere between horizontal and vertical, and thereby ride on the sides of the lane dividing wall. Similarly, another modification of the ELSV is envisioned to include a rail-like structure along the top of a retaining wall or a lane dividing wall, the rail-like structure being encased by a system of rollers or wheels on the ELSV itself.

The ELSV can also be adapted to tow one or more passive ELSV vehicles in a train-like configuration. Such a configuration finds useful applications in the event that more space is required for transporting people, fuel, water, equipment, and the like.

As an even further modification, an alternative drive mechanism for the ELSV utilizes a wheel and belt design along the top of the divider wall or along the retaining wall, as the case may be.

The foregoing is considered as illustrative only of the principles of the invention, and since numerous modifications and changes will readily occur to those skilled in the art, it is not desired to limit the invention to the exact construction and operation shown and described, and accordingly, all suitable modifications and equivalents may be resorted to, falling within the scope of the present invention.

I claim:

1. An automotive emergency life saving vehicle adapted to straddle a lane dividing wall, said emergency life saving vehicle comprising:
    a raised center portion coextending with the length of the vehicle;
    a pair of wells formed on opposite sides of said raised center portion and providing access to an interior portion of said emergency life saving vehicle;
    drive means for propelling said emergency life saving vehicle;
    at least four ground-level wheels for riding on opposite sides of the lane dividing wall;
    at least one centrally located wheel for riding on the lane dividing wall, said at least one centrally located wheel being positioned in the raised center portion, higher than the ground-level wheels; and
    means, accessible from inside and outside of said emergency life saving vehicle, for storing emergency equipment.

2. The emergency life saving vehicle of claim 1, further comprising at least one cot for transporting victims of an incident.

3. The emergency life saving vehicle of claim 1, further comprising a telescopic arm and cable system for towing vehicles.

4. The emergency life saving vehicle of claim 1, further comprising a diesel fuel tank, a gasoline tank, and two nozzle and pumping mechanisms for dispensing contents of said gasoline tank and said diesel fuel tank.

5. The emergency life saving vehicle of claim 1, wherein said drive means is capable of selectively using gasoline, electricity, or diesel fuel for powering said emergency life saving vehicle.

6. A system for providing emergency service on a bridge independently of traffic conditions on the bridge, said bridge having a central lane dividing wall, said lane dividing wall coextending with the length of the bridge and extending beyond one end of the bridge, said system comprising:
    a garage-like building having at least one garage door through which the lane dividing wall is extended, said garage-like building being located near said one end of the bridge; and
    an automotive emergency life saving vehicle adapted to straddle the lane dividing wall, said emergency life saving vehicle comprising:
        a raised center portion coextending with the length of the vehicle;
        drive means for propelling said emergency life saving vehicle;
        at least four ground-level wheels;
        at least one centrally located wheel for riding on the lane dividing wall, said at least one centrally located wheel being positioned in the raised center portion, higher than the ground-level wheels; and
        means for storing emergency equipment.

* * * * *